(12) United States Patent
Brown (10) Patent No.: US 8,681,428 B1
(45) Date of Patent: Mar. 25, 2014

(54) HIGH REFRACTIVE INDEX, POLARIZATION INSENSITIVE NANO-ROD BASED PLASMONIC METAMATERIALS FOR LENSES

(75) Inventor: Robert G. Brown, Tustin, CA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 171 days.

(21) Appl. No.: 13/438,733

(22) Filed: Apr. 3, 2012

(51) Int. Cl.
*G02B 3/00* (2006.01)
*G02B 27/10* (2006.01)
*G02C 7/00* (2006.01)
*G02C 3/00* (2006.01)

(52) U.S. Cl.
CPC . *G02B 3/00* (2013.01); *Y10S 359/90* (2013.01)
USPC ........... 359/642; 359/619; 359/620; 359/626; 359/652; 359/900; 351/159.02; 351/159.39; 351/159.75

(58) Field of Classification Search
USPC .............. 359/619, 620, 626, 642, 652, 900; 351/41, 159.01, 159.02, 159.39, 351/159.73, 159.74, 159.75
See application file for complete search history.

(56) References Cited

PUBLICATIONS

U.S. Appl. No. 13/243,342, filed Sep. 23, 2011, Brown et al.
Ishii, S. et al., Metal nano-slit lenses with polarization selective design, Optics Letters, vol. 36, No. 4, Feb. 15, 2011, pp. 451-453.
Kildishev, A. V. et al., Transformation optics and metamaterials, Physics-Uspekhi, vol. 54(1), Jan. 2011, 19 pages.
Pendry, J. B. et al., Controlling electromagnetic fields, Science, vol. 312, Jun. 23, 2006, 5 pages.
Shalaev, V. M., et al., Negative index of refraction in optical metamaterials, Optics Letters, vol. 30, No. 24, Dec. 15, 2005, 5 pages.
West, P. R., et al., Searching for better plasmonic materials, Laser Photonics Reviews, vol. 4, No. 6, 2010, pp. 795-808.

*Primary Examiner* — Jack Dinh
(74) *Attorney, Agent, or Firm* — Donna P. Suchy; Daniel M. Barbieri (57) ABSTRACT

An optical material is described. The optical material includes at least one layer of a metamaterial. Each layer of metamaterial includes a matrix material and a plurality of nano-particles. The plurality of nano-particles are geometrically arranged in an array within the matrix material such that the layer of metamaterial has a high positive refractive index based on a cooperative plasmon effect at a predetermined electro-magnetic radiation (EMR) wavelength relative to the refractive index of the matrix material without the nano-particles.

30 Claims, 9 Drawing Sheets

HIGH REFRACTIVE INDEX, POLARIZATION INSENSITIVE NANO-ROD BASED PLASMONIC METAMATERIALS FOR LENSES

FIELD OF THE INVENTION

The present invention relates to an optical material of a metamaterial, where the metamaterial has a high positive refractive index, and to lenses and optical systems including the optical material.

BACKGROUND OF THE INVENTION

Conventional lenses are typically formed of a number of varying thickness pieces of glass or plastic to make compound lenses of a sufficient f/#, and to provide better imaging quality. In particular, fast low f/# lenses, e.g., f/1 or f/2, can become very bulky and heavy. The size and weight of such lenses presents deployment problems, such as for night-vision equipment, or for optical systems aboard UAVs (unmanned aerial vehicles) for persistent surveillance.

The recent development of Transformation Optics (TO) provides a new way of looking at the independent control of the electrical and magnetic components of electromagnetic fields [see Pendry, J. B., Schurig, D. & Smith, D. R., (2006) '*Controlling electromagnetic fields*', Science, 312, pp. 1780-1782]. TO is enabled in practice through the use of metamaterials. As disclosed in Pendry et al. " . . . metamaterials owe their properties to their sub-wavelength material-structure rather than to their chemical composition, and can be designed to have properties impossible to find in nature."

At the sub-wavelength level, light breaks up into its component electrical and magnetic fields, and the concept of a ray of light is meaningless. In this case, TO replaces Snell's Law of Refraction. TO is the valid mathematics at the sub-wavelength scale.

Ishii et al. describe metal nano-slit lenses using a polarization-selective design [Ishii, S. et al., (2011) '*Metal nano-slit lenses with polarization selective design*', Optics Letters, 36, pp. 451-453]. The nano-slit lenses described in Ishii et al. had a design of nano-slits formed in a gold thin film. Both concave and convex lenses are described in Ishii et al., but such lenses have a serious drawback for general use—they only work for a certain plane polarization of light to be imaged.

Lenses with negative refractive index metamaterials are known. With such negative refractive index metamaterials the goal is perfect lenses with unlimited resolution. Shalaev et al. [Shalaev, V. M., et al., (2005) '*Negative index of refraction in optical metamaterials*', Optics Letters, 30, pp. 3356-3358] discuss the use of close-spaced gold nano-rod pairs in air on top of a dielectric substrate to create a metamaterial for the purpose of creating negative refractive index materials.

Kildishev and Shalaev disclose the design of cylindrical-lenses for super-resolution and optical-cloaking [Kildishev, A. V. & Shalaev, V. M., (2011) '*Transformation optics and metamaterials*', Physics-Uspekhi, 54, pp. 53-63]. Such cylindrical lenses, however, are not for use in everyday imaging systems. These cylindrical lenses require the object to be imaged to be placed inside the cylindrical lens. Cylindrical metamaterial lenses are of the wrong geometry and scale for most uses. Moreover, the cylindrical lenses of Kildishev and Shalaev were of a negative refractive index design in a metal-dielectric system.

West et al. [West, P. R., et al., (2010) '*Searching for better plasmonic materials*', Laser Photonics Reviews, 4, pp. 795-808] have identified that transparent conductive oxides may be used to construct lower loss negative index materials than can be created using metals such as gold, silver or copper etc. The oxides and nitrides identified include indium tin oxide (ITO), Al:ZnO and Ga:ZnO. TiN and ZrN are also found to be useful nitrides for metal replacement. West et al. have speculated that the benefit of oxide and nitride replacements for metals such as gold in metamaterial construction is likely to be found in the visible and near IR spectral regions for negative index material construction. The focus of West et al. is to make negative refractive index materials for the creation of 'perfect lenses' etc.

SUMMARY OF THE INVENTION

According to one embodiment of the invention, an optical material is provided. The optical material comprises: at least one layer of a metamaterial, each layer of metamaterial comprising: a matrix material; and a plurality of nano-particles geometrically arranged in an array within the matrix material such that the layer of metamaterial has a high positive refractive index based on a cooperative plasmon effect at a predetermined electro-magnetic radiation (EMR) wavelength relative to the refractive index of the matrix material without the nano-particles.

According to another embodiment of the invention there is provided a method of operating an optical element comprising an optical material, wherein the optical material comprises: at least one layer of a metamaterial, each layer of metamaterial comprising: a matrix material; and a plurality of nano-particles geometrically arranged in an array within the matrix material such that the layer of metamaterial has a high positive refractive index based on a cooperative plasmon effect at a predetermined electro-magnetic radiation (EMR) wavelength relative to the refractive index of the matrix material without the nano-particles. The method comprises adjusting the optical element to receive EMR at the predetermined EMR wavelength.

According to another embodiment of the invention there is provided a method of forming an optical material comprising at least one layer of a metamaterial. The method comprises: forming a matrix material; and embedding a plurality of nano-particles to be geometrically arranged in an array within the matrix material to form the at least one layer of a metamaterial such that the at least one layer of metamaterial has a high positive refractive index based on a cooperative plasmon effect at a predetermined electro-magnetic radiation (EMR) wavelength relative to the refractive index of the matrix material without the nano-particles.

DETAILED DESCRIPTION OF THE PREFERRED EMBODIMENTS

Applicant has found that very thin and light weight lens may be designed using an optical material formed of a metamaterial, where the metamaterial provides for a high positive refractive index according to one embodiment. The use of such a metamaterial for lenses allows for shapes and diameters closer to those of traditional lenses but with effective refractive indexes much greater. Such very thin and light weight lenses allow for the replacement of conventional thick and heavy lenses.

Moreover, such metamaterial lens may be polarization insensitive. Thus, such metamaterial lens may be used with arbitrary or unpolarized light input.

The metamaterial structures described here for high positive refractive index optical materials are different from those created for negative index materials. With negative refractive index materials the goal is perfect lenses with unlimited resolution. With high positive refractive index metamaterials, ultra-thin and light-weight lenses may be achieved, and used for imaging-systems in environments where weight and size are extremely important, such as on UAVs and in helmet mounted imaging technology according to an embodiment.

Applicant has found that metamaterials formed of nano-particles embedded in a matrix material and arranged in a lattice (array) solves the problem of making high positive refractive index metamaterials. Such metamaterials may be used as a material for thinner, lighter lenses than of conventional materials such as glass or plastic in one embodiment.

By introducing amplification (gain) into high refractive index metamaterials, optical losses may be offset. In this way amplification of the photons may be provided before the photons enter the eye or are detected by a detector, for example. Such amplification to offset optical losses may be useful in a number of applications, such as night-vision optics, spectacles (glasses) or contact lenses that might be worn during the day (attenuating light as in sunglasses) or at night (amplifying dimly lit scenes) for night-vision according to one embodiment.

For optical materials formed of metamaterials as described herein, positive refractive index values of 6 or more appear to be possible based on calculation and design in the SWIR (short wave infrared)/MWIR (mid wave infrared) and LWIR (long wave infrared) spectral regions. Such positive refractive index values are 1.5× to 3× that of existing materials used in these regions, and provide significant advantages regarding lens design, dimensions and weight according to one embodiment.

Using transparent conducting oxides, such as indium tin oxide (ITO), positive refractive index values advantages may be extended to the visible and NIR (near infrared) regions according to one embodiment.

Nano Plasmonic Physics for High Index of Refraction Materials

The metamaterial having a high positive refractive index according to embodiments of the present invention is based on a cooperative plasmon effect of nano-particles arranged within a matrix material. Basic nano-plasmonic physics is discussed, for example, in U.S. application Ser. No. 13/243, 342, filed Sep. 23, 2011, entitled NANO-STRUCTURE ARRAYS FOR EMR IMAGING, the entire contents of which are incorporated by reference. While the detector materials described in U.S. application Ser. No. 13/243,342 have a structure optimized to enhance EMR absorption and non-radiative decay, the metamaterials described in the present application have a structure optimized to enhance radiative decay, and in particular to provide a real, high positive value, refractive index, as described further below. By selecting the matrix and nano-particle materials appropriately, as well as the geometry and arrangement of the array of the nano-particles within the matrix material, the metamaterial may be designed to have a high positive refractive index at a desired predetermined EMR wavelength, where the predetermined EMR wavelength is in the ultraviolet, visible, near infrared, short wave infrared, mid wave infrared, long wave infrared, or TeraHertz region of the electromagnetic spectrum.

As an example of an appropriate matrix and nano-particle material for use in the THz region, Choi et al. [Choi et al., 2011 'A terahertz metamaterial with unnaturally high refractive index', Nature, 470, pp. 369-373], disclose a THz metamaterial with unnaturally high refractive index. The multi-layer metamaterials of Choi et al. were constructed from H-shaped structures of metal embedded in a dielectric material.

As an example of an appropriate matrix and nano-particle material for use in the visible-NIR region, gold nano-particles may be used.

High Refractive Index Nano-Rod Plasmonic Metamaterials

Figure 1A:
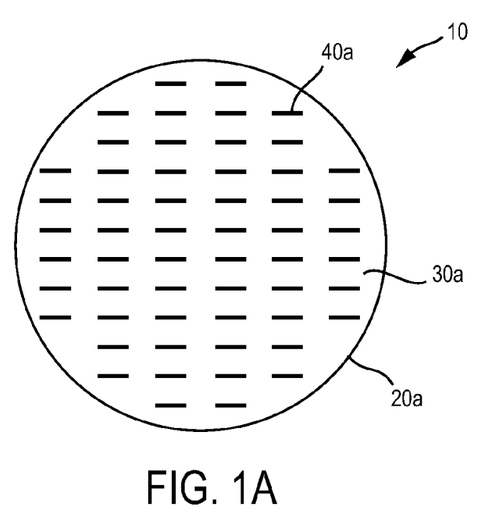
FIG. 1A is a front view of an optical material according to an exemplary embodiment.
Figure 1B:
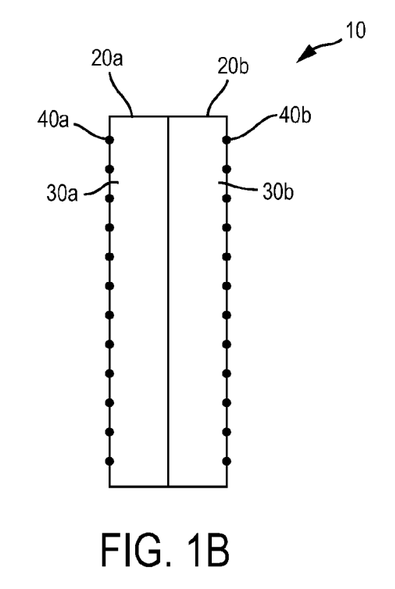
FIG. 1B is a side view of the optical material illustrated in FIG. 1.

FIGS. 1A and 1B illustrate an optical material 10 according to an exemplary embodiment. The optical material 10 comprises one or more layers 20a, 20b of a metamaterial. While FIGS. 1A and 1B illustrate two layers, in general, the number of layers may be more or less than two. Each layer of metamaterial 20a, 20b includes a matrix material 30a, 30b, and a plurality of nano-particles 40a, 40b arranged within the matrix material 30a, 30b. The plurality of nano-particles 40a, 40b are geometrically arranged in an array such that the layer of metamaterial 20a, 20b has a high positive refractive index based on a cooperative plasmon effect at a predetermined electro-magnetic radiation (EMR) wavelength relative to the refractive index of the matrix material without the nano-particles.

The plurality of nano-particles 40a, 40b may be geometrically arranged in at least one of a regular or an irregular array, for example. The array may be at least one of a square array, a rectangular array, a hexagonal array or an octagonal array, for example.

The nano-particles 40a, 40b may comprise metals, or transparent conducting oxides or nitrides, for example. The nano-particles 40a, 40b may comprise gold, silver, copper, or aluminum. The nano-particles 40a, 40b may be at least one of indium tin oxide (ITO), Al:ZnO, Ga:ZnO; TiN or ZrN. The nano-particles 40a, 40b may comprise single-walled carbon nanotubes, or highly doped short length semiconductor nanowires. The shapes of the nano-particles 40a, 40b may be, for example, cylinders, rods, rectangular cross-section bars, ellipsoid, stars, spheres, spheroids, cones, cups, shells, rings or cubes.

Figure 2:
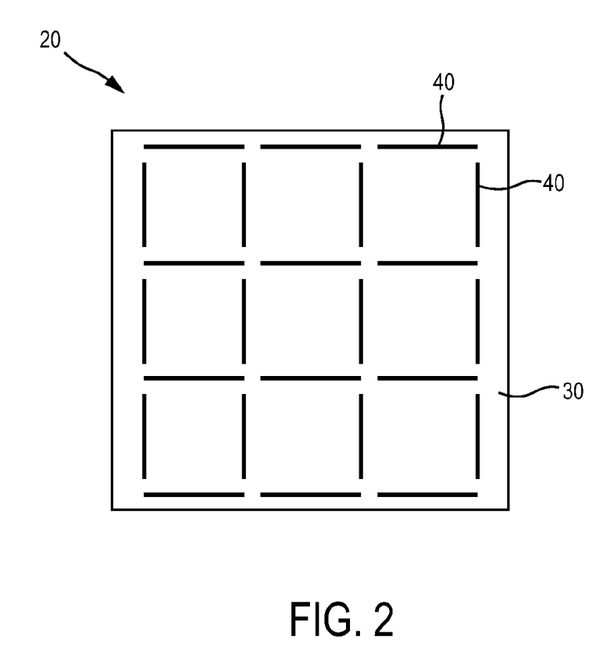
FIG. 2 is a plan view of a square lattice of nano-rods, according to an exemplary embodiment.

The refractive index of an examplary system based on gold nano-rods as the nano-particles arranged in a square array in a silicon matrix may now be calculated. FIG. 2 provides one example of a square array of a metamaterial 20 with nano-particles 40 in a matrix 30, the nano-particles 40 being nano-rods arranged in a square array which is insensitive to EMR polarization of the EMR being transmitted or reflected.

The gold-silicon, or a silver-silicon system, provides transmission of EMR in the NIR regions. For transmission at shorter, visible and near infrared wavelengths, transparent oxides or nitrides may used in place of gold (or silver), to reduce losses while maintaining high refractive index. Aluminum as well as transparent oxides may be used in the ultraviolet region.

The design of nano-rod metamaterials for high refractive index optical materials may be optimized by using the nano-plasmonic physics and mathematics set out in U.S. application Ser. No. 13/243,342, filed Sep. 23, 2011, entitled NANO-STRUCTURE ARRAYS FOR EMR IMAGING, incorporated by reference, but optimized here not for maximum absorption, but for maximum reflection/transmission. The calculation is based on interacting plasmons resonating in a lattice (array), and where at some optimal lattice size, the refractive index of the gold nano-rod lattice is maximized. As described below, factors of 2× and more refractive indices are provided, as compared to conventional materials used in infra-red lenses.

For the gold-silicon system the refractive index in the SWIR and LWIR are now determined. MWIR metamaterial performance is somewhere between these two IR extremes.

Using FIG. 2 as the basis for creating a lattice of gold nano-rods embedded in a silicon matrix, and using the literature values of the real and imaginary part of the materials refractive indexes for these materials in the infrared region [Palik, E. D., (1998) 'Handbook of Optical Properties of Solids', Elsevier], the normal incidence transmission, reflection and absorption coefficients can be determined for that geometry as a function of gold nano-rod diameter and length, and lattice constant, i.e., the spacing between adjacent nano-rods, assuming the nano-rod length is such that the nano-rods never touch or cross over in the lattice.

LWIR

Figure 3:
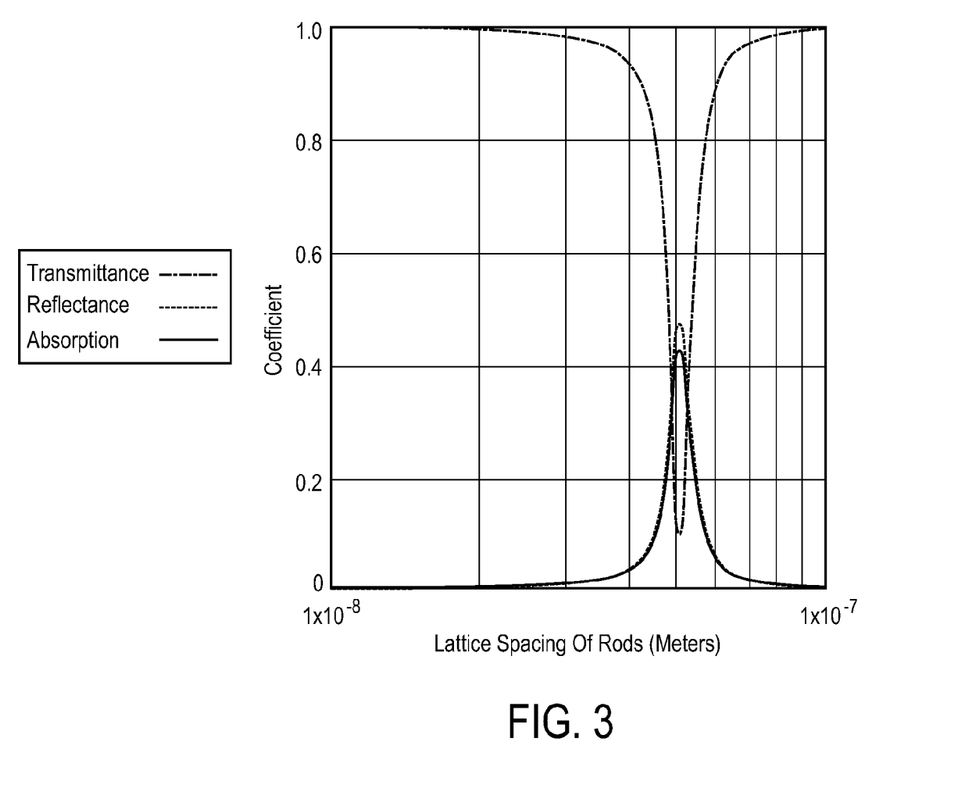
FIG. 3 is a graph showing the transmission, reflection and absorption as a function of lattice constant for a square lattice of gold nano-rods in a silicon matrix and a 10 micron EMR wavelength.

An example of such calculation of the transmission, reflection and absorption for the metamaterial for 10-micron wavelength LWIR EMR is shown in FIG. 3.

At the resonance point, both the reflectivity and the absorption have maximum values, where the reflection and refractive index are based on the Fresnel reflection coefficient calculation in standard optics. The high absorption may be compensated for loss, as described later.

In FIG. 3, it can be seen that for nano-rods of diameter 10 nm, and length 20 nm, a lattice constant of around 50 nm is best. From the reflection coefficient, using the standard-optics Fresnel equations, the real part of the refractive index can be estimated, as shown for 8-micron, 10-micron and 12-micron LWIR EMR wavelengths in FIG. 4, for a lattice spacing of 52 nm with a lattice array of gold nano-rods in silicon, where the nano-rods are 20 nm long and 15 nm in diameter.

The transmittance, T, reflectance, R, and refractive index, RI, may be determined from the following equations:

$$T = \left[1 + 16\pi^2 \frac{\text{Im}\{\alpha_{\text{eff}}\}}{lc^2 \cdot \lambda \cdot (N_S + N_M)} + 64 \cdot \frac{\pi^4}{[lc^2 \cdot \lambda \cdot (N_S + N_M)]^2} \cdot |\alpha_{\text{eff}}|^2\right]^{-1} \quad (1)$$

$$R = \frac{64 \cdot \pi^4}{[lc^2 \cdot \lambda \cdot (N_S + N_M)]^2} \cdot |\alpha_{\text{eff}}|^2 \cdot T \quad (2)$$

$$RI = \frac{1 + (R)^{0.5}}{1 - (R)^{0.5}} \quad (3)$$

where lc is the lattice dimension, $\lambda$=EMR wavelength, $\alpha_{\text{eff}}$=effective polarizability, $N_S$=refractive index of substrate, and $N_M$=refractive index of medium surrounding the nano-particles (nano-rods).

Figure 4:
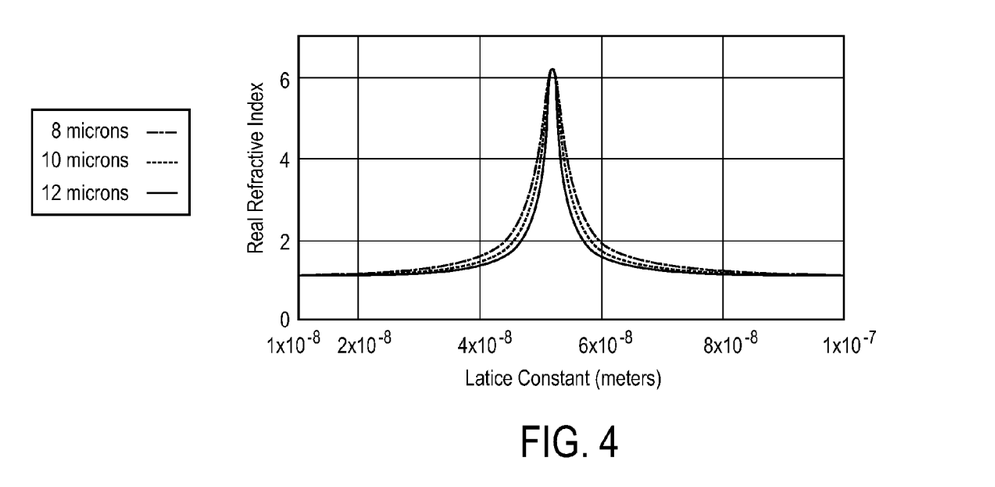
FIG. 4 is a graph showing the real part of the index of refraction as a function of lattice constant for a square lattice of gold nano-rods in a silicon matrix at wavelengths of 8, and 12 microns where the nano-rods are 20 nm long and 15 nm in diameter.

FIG. 4 shows a peak refractive index exceeding the value 6.0 for all three wavelengths (8-micron, 10-micron and 12-micron), representing the shortest to longest wavelengths of the useful LWIR spectrum. This refractive index is around 1.5× that of the most popular optical material used at these wavelengths, i.e., germanium, which has a refractive index of about 4 in the LWIR.

Figure 5:
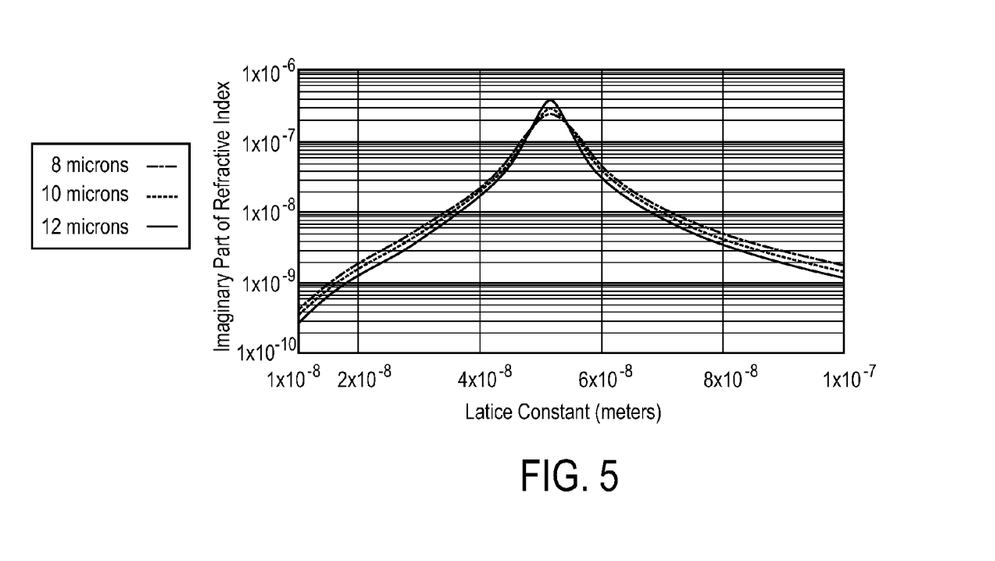
FIG. 5 is a graph showing the imaginary part of the index of refraction as a function of lattice constant for a square lattice of gold nano-rods in a silicon matrix at wavelengths of 8, 10 and 12 microns where the nano-rods are 20 nm long and 15 nm in diameter.

The corresponding imaginary part of the refractive index can be calculated from the absorption coefficient calculation [see Born, M. & Wolf, E., (1999) 'Principles of Optics', Cambridge University Press, 7$^{th}$ Edition, pp. 218-219], as shown in FIG. 5, for the three wavelengths (8-micron, 10-micron and 12-micron) for a lattice array of gold nano-particles in silicon, where the nano-rods are 20 nm long and 15 nm in diameter.

Figure 6:
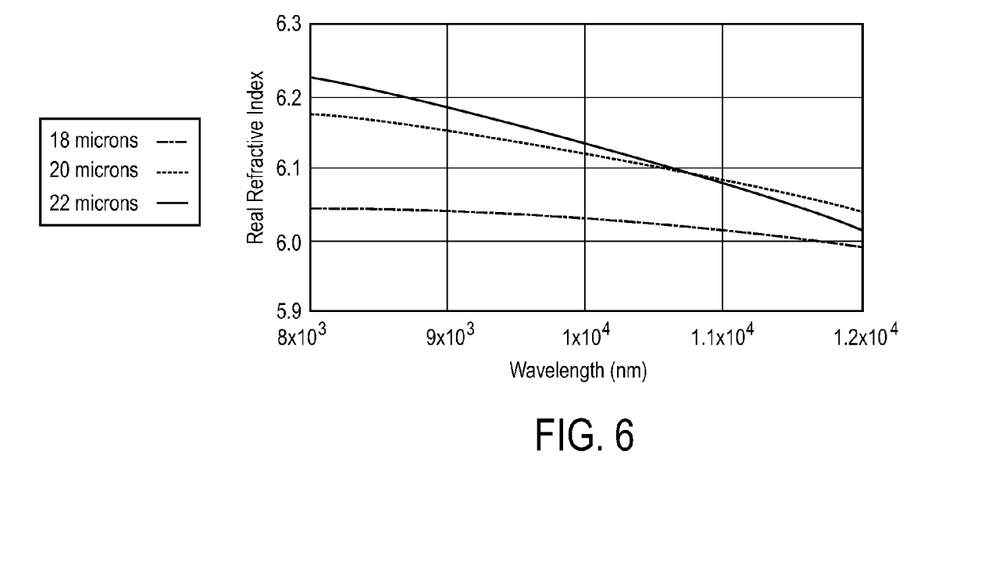
FIG. 6 is a graph showing the real part of the index of refraction as a function of EMR wavelength for a square lattice of gold nano-rods in a silicon matrix for nano-rods 18, and 22 nm long and 15 nm in diameter.

Dispersion effects in the LWIR metamaterial described above are shown in FIG. 6 for the lattice with a 52 nm lattice constant. FIG. 6 illustrates the refractive index variation with wavelength change across the LWIR. The dispersion is quite substantial, but may be corrected through the use of multiple layers of different LWIR metamaterials, thus allowing for high quality, low-aberration imaging in a typical complex lens system.

Figure 7:
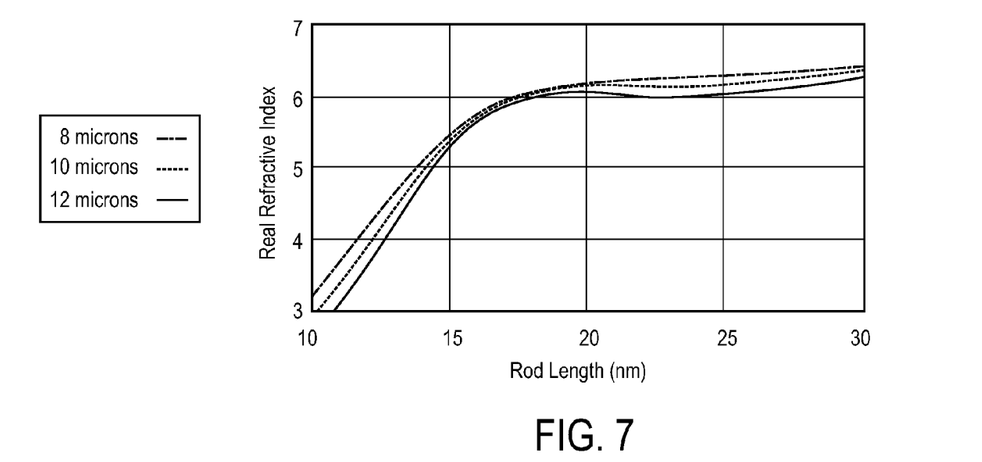
FIG. 7 is a graph showing the real part of the index of refraction as a function of nano-rod length for a square lattice of gold nano-rods in a silicon matrix at wavelengths of 8, and 12 microns where the nano-rods are 15 nm in diameter.

FIG. 7 illustrates the sensitivity of the metamaterial refractive index to changes in nano-rod length. It can be seen in FIG. 7 that across the entire LWIR spectrum (8 to 12 microns), when the nano-rod length is chosen to be around 15 nm to 20 nm, the refractive index is fairly insensitive to small length variation.

SWIR

Figure 8:
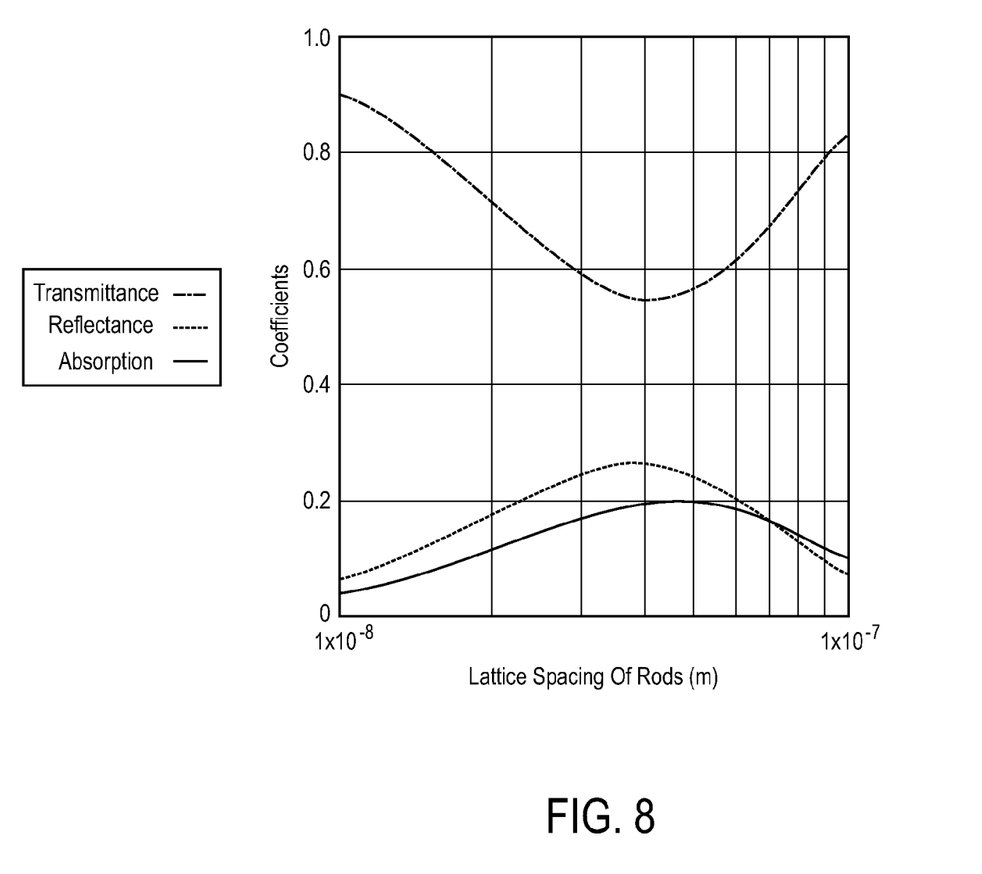
FIG. 8 is a graph showing the transmission, reflection and absorption as a function of lattice constant for a square lattice of gold nano-rods in a silicon matrix and a 1 micron EMR wavelength.

An example of the calculation of the transmission, reflection and absorption for a metamaterial for 1-micron wavelength SWIR EMR is shown in FIG. 8 for a lattice of gold nano-rods embedded in a thin silicon matrix, and in the lattice configuration shown in FIG. 2, where the nano-rods are 20 nm long and 10 nm in diameter. At the resonance point using the standard-optics Fresnel equations, both the reflectivity and the absorption have maximum values. The high absorption may be compensated for loss, as described later.

In FIG. 8 it can be seen that for nano-rods of diameter 10 nm and length 20 nm, a lattice constant of around 40 nm is best. From the reflection coefficient, using the standard-optics Fresnel equations, the real part of the refractive index can be estimated, as shown for 1-micron, 2-micron and 3-micron SWIR wavelengths in FIG. 9 for a lattice array of gold nano-rods in silicon, where the nano-rods are 20 nm long and 24 nm in diameter. The peak refractive index occurs for a lattice spacing of about 60 nm.

Figure 9:
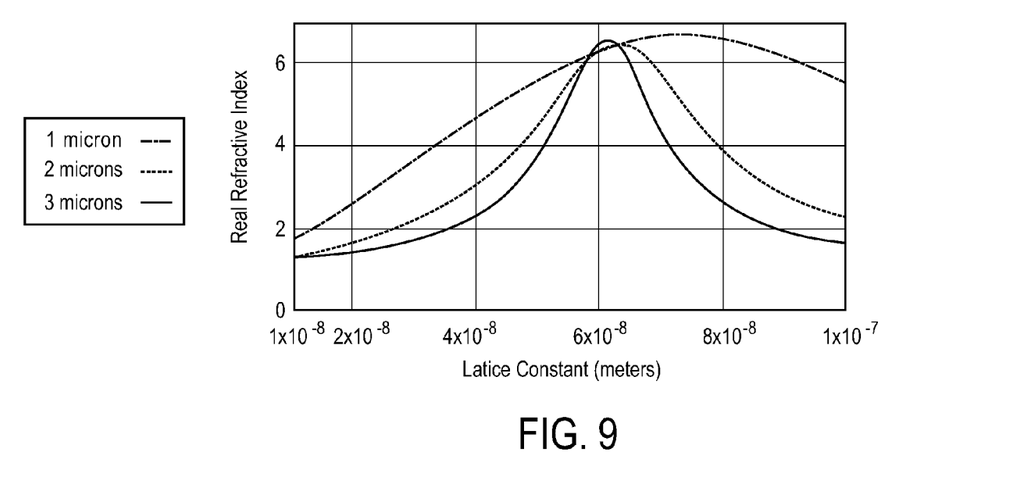
FIG. 9 is a graph showing the real part of the index of refraction as a function of lattice constant for a square lattice of gold nano-rods in a silicon matrix at wavelengths of 1, 2 and 3 microns where the nano-rods are 20 nm long and 24 nm in diameter.

FIG. 9 illustrates a peak refractive index for all 3 wavelengths (1-micron, 2-micron and 3-micron), representing the shortest to longest wavelengths of the useful SWIR spectrum—exceeding the value 6.0. The refractive index is around 3× that of the most popular optical material used at these wavelengths, where the refractive index is less than 2.

Figure 10:
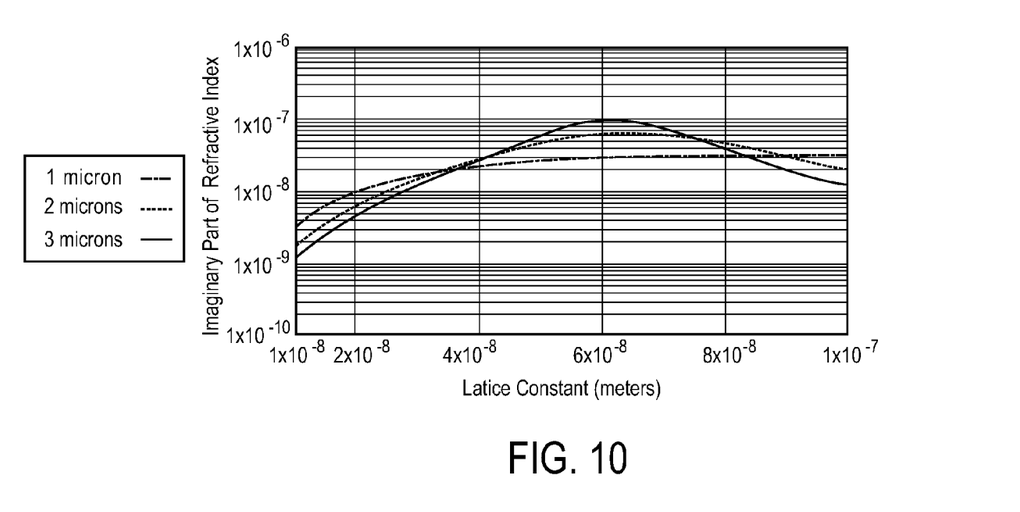
FIG. 10 is a graph showing the imaginary part of the index of refraction as a function of lattice constant for a square lattice of gold nano-rods in a silicon matrix at wavelengths of 1, 2 and 3 microns where the nano-rods are 20 nm long and 24 nm in diameter.

The corresponding imaginary part of the refractive index can be calculated from the absorption coefficient calculation [see Born, M. & Wolf, E., (1999) 'Principles of Optics', Cambridge University Press, 7$^{th}$ Edition, pp. 218-219], as shown in FIG. 10 for the three wavelengths (1-micron, 2-micron and 3-micron) for a lattice array of gold nano-rods in silicon, where the nano-rods are 20 nm long and 24 nm in diameter.

Figure 11:
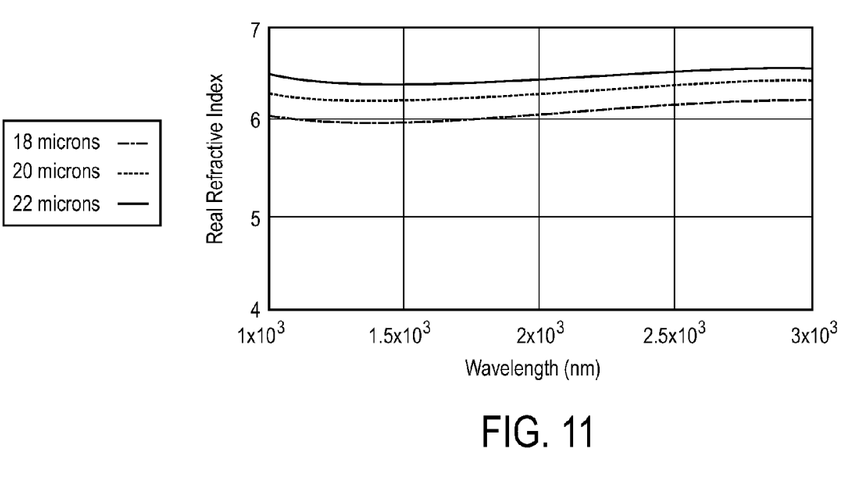
FIG. 11 is a graph showing the real part of the index of refraction as a function of EMR wavelength for a square lattice of gold nano-rods in a silicon matrix for nano-rods 18, and 22 nm long and 24 nm in diameter.

Dispersion effects in the SWIR metamaterial described above are shown in FIG. 11 for the lattice with a 60 nm lattice constant. FIG. 11 illustrates the refractive index variation with wavelength change across the SWIR. The dispersion is quite substantial, but may be corrected through the use of multiple layers of different SWIR metamaterials, thus allowing for high quality, low-aberration imaging in a typical complex lens system.

Figure 12:
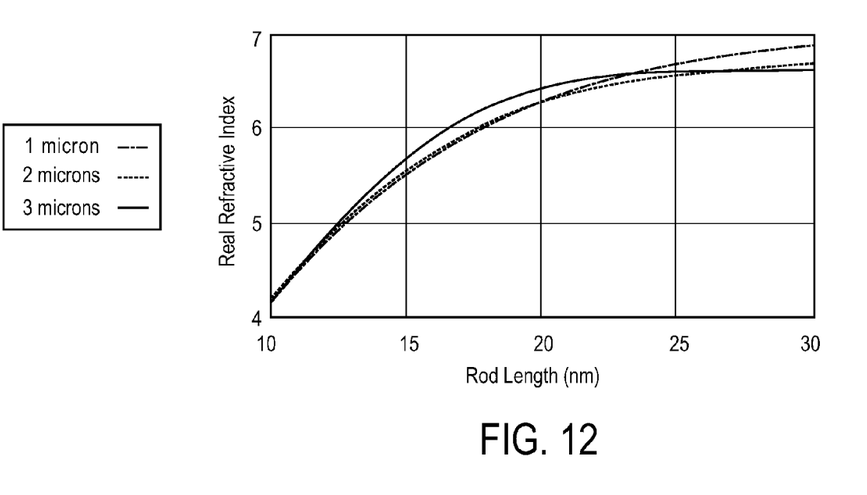
FIG. 12 is a graph showing the real part of the index of refraction as a function of nano-rod length for a square lattice of gold nano-rods in a silicon matrix at wavelengths of 1, 2 and 3 microns where the nano-rods are 24 nm in diameter.

FIG. 12 illustrates the sensitivity of the metamaterial refractive index to changes in nano-rod length. It can be seen in FIG. 12 that across the entire SWIR spectrum (1 to 3 microns), when the rod-length is chosen to be around 20 nm to 30 nm, the refractive index is fairly insensitive to small length variation.

Transparent Conductive Oxides Nano-Particles for Low-Loss Metamaterials of High Refractive Index in the Visible and NIR Transparent conductive oxides and nitrides may be used as nano-particles embedded in silicon for a high positive index of refraction metamaterial in the visible and NIR. Appropriate oxides and nitrides include indium tin oxide (ITO), Al:ZnO, Ga:ZnO, TiN and ZrN.

Lenses

Figure 13:
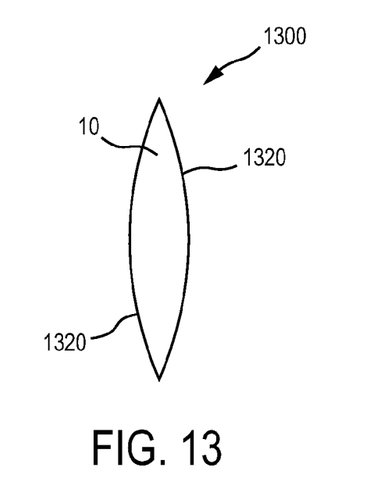
FIG. 13 illustrates a side view of a lens having a curved surface and formed of an optical material according to an exemplary embodiment.

FIG. 13 illustrates a lens 1300 according to an embodiment. The lens 1300 is made of an optical material 10, such as the optical material 10 of FIG. 1A, which has a high positive index of refraction. As can be seen in FIG. 13, the lens 1300 has one or more curved surfaces 1320 as is known for lenses, for focusing and dispersing EMR incident on the lens 1300.

Figure 14:
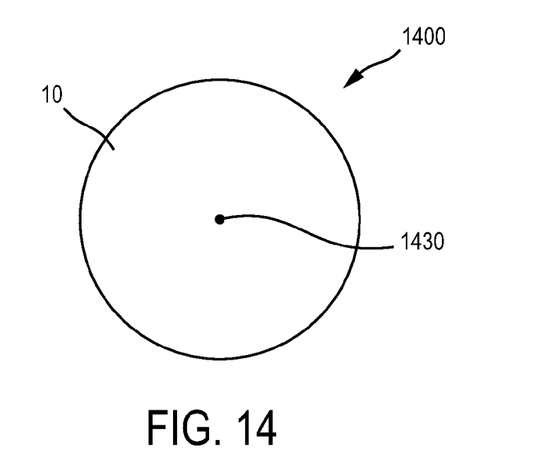
FIG. 14 illustrates a front view of a GRIN lens formed of an optical material according to an exemplary embodiment, where the index of refraction is spatially varying.

FIG. 14 illustrates a lens 1400 according to another embodiment, where the lens 1400 is a graded-index (GRIN) lens made of an optical material 10, such as the optical material 10 of FIG. 1A, which has a high positive index of refraction. In this case, the lens 1400 may have a flat surface. The GRIN lens 1400 has an index of refraction which varies as a function of the radial distance from the central axis 1430 of the lens 1400. The local refractive index of the lens 1400 may be spatially varied, for example, by varying the lattice constant of the metamaterial as a function of the distance from the from the central axis 1430. The spatial scale of the geometrical arrangement of the nano-particle dimensions may be non-uniform such that the optical material 10 has a spatially varying refractive index gradient for the lens 1400.

In general the local refractive index of the GRIN lens may be spatially varied by spatially varying the arrangement of nano-particles in the lens. The local refractive index of the GRIN lens may be spatially varied, using a variable arrangement of the nano-particle in the substrate plane, for example, by (1) varying the refractive index for a given wavelength by detuning the plasmon resonance, or (2) varying the wavelength response for a given refractive index's plasmon resonance.

Figure 15:
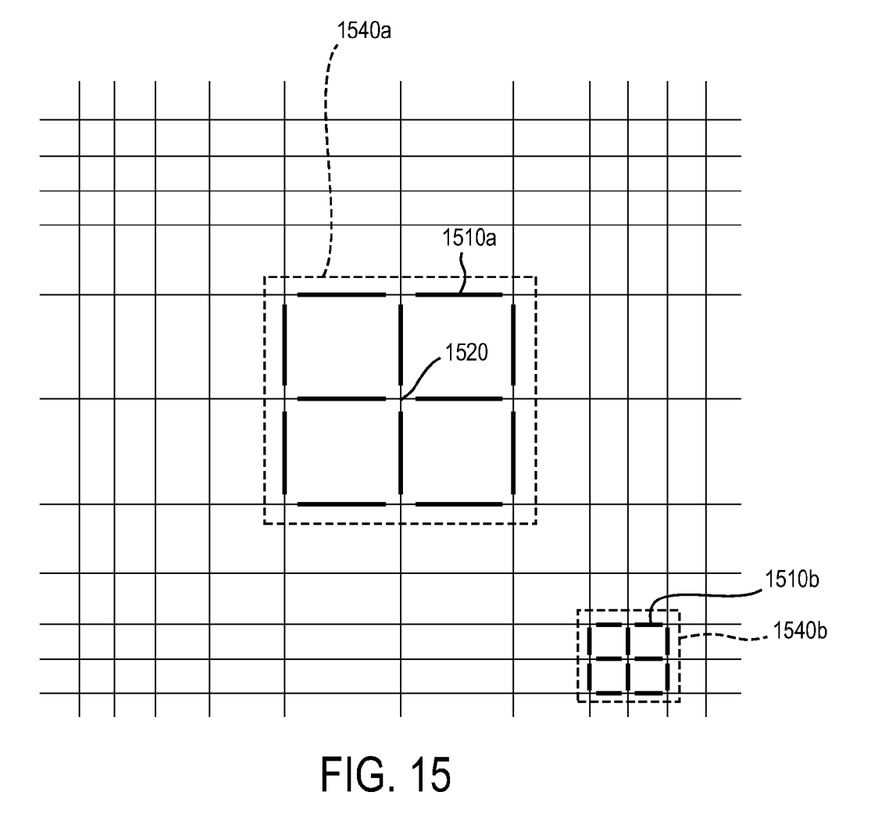
FIG. 15 illustrates a front view of a layout of nano-particles of a GRIN lens according to an exemplary embodiment.

FIG. 15 illustrates a front view of a layout of nano-particles 1510 (1510a or 1510b) for a GRIN lens in the plane perpendicular to the optical axis 1520 of the GRIN lens. The nano-particles 1510 in the lens are arranged in a square lattice, and thus provide a polarization insensitive arrangement.

In FIG. 15, the nano-particles 1510 are arranged on lattice lines 1530. For ease of illustration, only some of the nano-particles are shown in FIG. 15 on the lattice lines, and in particular, only two 2×2 square regions 1540a and 1540b, are shown. In general, the nano-particles will be arranged on the lattice lines 1530 of the entire lattice.

The refractive-index in the two different 2×2 square regions 1540a and 1540b is substantially different, because the nano-particle length, thickness, and lattice constant of the square region 1540a located at the optical axis 1520 is different than that of the square region 1540b located away from the optical axis 1520. While FIG. 15 illustrates the nano-particle length, thickness, and lattice constant decreasing with an increasing distance from the optical axis 1520, alternatively, the nano-particle length, thickness, and lattice constant may increase with an increasing distance from the optical axis 1520. The underlying spatially varying grid pattern of the lattice lines 1530 illustrates how spatial-grading of the nano-particle length, thickness, and lattice constant proceeds across a plane to make a graded-refractive index plane.

While FIG. 15 illustrates a polarization insensitive arrangement where all four sides of each square lattice cell in FIG. 15 have a nano-particle, polarization sensitive arrangements are also possible. A polarization sensitive arrangement may be accomplished, for example, by having only two opposing sides of each square cell be occupied with a nano-particle, where only the vertical or horizontal of the lattice lines 1530 are occupied.

While FIG. 15 illustrates a design where the nano-particle lattice constant is varied, alternatively, the nano-particle lattice constant may be fixed, and only the nano particle thickness and length may be varied to create a desired refractive index and dispersion profile. In general, any one or more of the nano-particle lattice constant, length and thickness may be varied.

While FIG. 15 illustrates the nano-particles arranged in a direction perpendicular to the optical axis 1520, alternatively, the nano-particles may be arranged in planes such that the nano-particles are arranged in a direction parallel to the optical axis 1520. The nano-particles may be arranged perpendicular to the substrate surface, using fixed or variable nano-particle lengths, thickness and lattice constants to vary the spatial profile of the refractive index across the spatial extent of the lattice to create a GRIN lens. Either type of arrangement may provide spatially graded refractive index.

To use this spatially graded refractive index, EMR may be directed parallel to the plane of nano-particles, or perpendicular to that plane depending on the functionality required. When using EMR directed parallel to the plane of nano-particles, it is expected that many such planes of nano-particles may be stacked parallel to each other to create a thickness larger than the EMR wavelength incident, so as to avoid diffraction effects.

The rays of EMR directed co-planar with the nano-particles will be progressively curved to focus or diverge according to the point of entry and direction into the nano-particle arrangement of the GRIN lens, and the grid spacing of the lattice may be arranged to make such ray curvature, as well as refractive index distribution, parabolic, hyperbolic, ellipsoidal or other geometry. Thus, the described nano-particle based lenses here provide an advantage over the parabolic-like existing GRIN lenses.

Figure 16A:
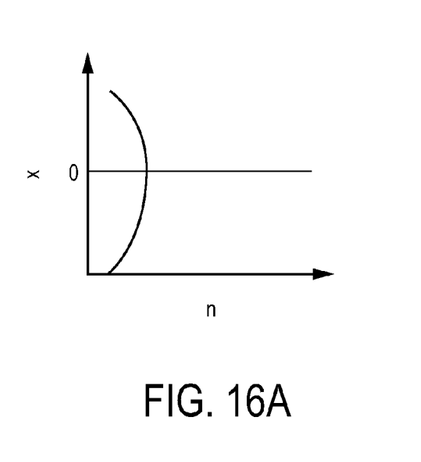
FIG. 16A is a graph illustrating the variation of index of refraction of a GRIN lens with radial distance according to an exemplary embodiment.
Figure 16B:
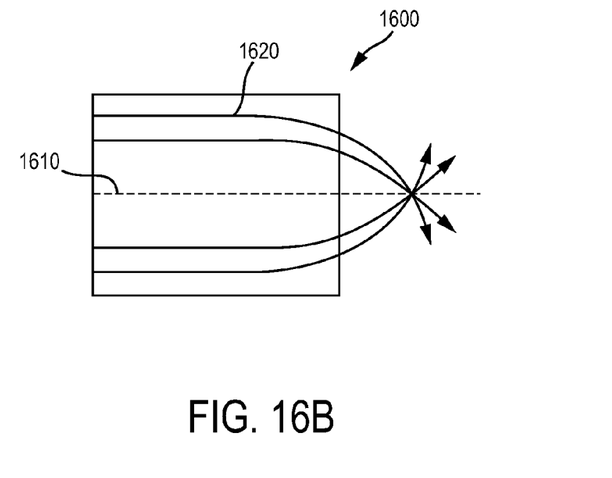
FIG. 16B is a side cross-sectional view of a GRIN lens according to an embodiment of the invention illustrating the path of EMR rays incident on a front surface of the GRIN lens.

FIG. 16A illustrates the variation of index of refraction n of a GRIN lens with radial distance x for a GRIN lens according to an embodiment of the invention, where FIG. 16B illustrates a side cross-sectional view of the GRIN lens 1600 and illustrates the path of EMR rays 1620 incident on a front surface of the GRIN lens having optical axis 1610. As can be seen in FIG. 16A, the GRIN lens of FIG. 16B has a parabolic variation of refractive index (n) with radial distance (x). Thus, the GRIN lens of FIG. 16B, which is based on a nano-particle design, focuses EMR in a same way as a conventional lens.

A nano-particle based GRIN lens design provides a great flexibility in GRIN lens design. EMR directed perpendicular to the plane of nano-particles, especially with variation of nano-particle dimensions in each small square cell, can allow the creation of gradient spectral focusing i.e., different effects for different EMR wavelengths, especially for oblique illuminations. Moreover, such a nano-particle based design provides for complete control of the local refractive index and its wavelength sensitivity at the nano-scopic scale, grid square by grid square, as the length and thickness (cross-section) can be changed for each and every nano-particle in the array forming the plane of the lens.

The nano-particle based GRIN lens design may have a number of applications. These applications may be, for example, micro-lens and nano-lens arrays, lens-arrays for use with focal-plane array detectors, ultra-wide bandwidth hyper-spectral imagery, telecommunication spatial-multiplexing and signal cross/inter-connections, biological and medical imaging at the cellular and sub-cellular spatial-scale, and miniaturized 3D-integral-imaging and computational-imaging systems.

The nano-particle based GRIN lens design may provide a nonlinear optics effect. Such nonlinear optics effect may be based on, for example, optical susceptibilities such as $\chi^{(2)}$ and $\chi^{(3)}$.

Gain in Lenses

A key challenge in developing and using metamaterials is that of optical loss. Scattering and absorption losses in structured materials can be large, depending on the materials to be embedded and the desired wavelength of operation. Gain may be provided not only to achieve loss compensation, but also to provide signal-gain prior to detection. Described below is a system with metamaterials having high positive index of refraction, and elements providing optical gain in such high positive index of refraction metamaterials at the EMR wavelength of interest. The gain material for providing gain may be embedded in or close to the matrix material, where the gain material provides an amplification or reduction of EMR passing through the optical material at the predetermined EMR wavelength.

One advantage of providing optical gain in such high positive index of refraction metamaterials is the application to night-vision optics to multiply the incoming (coherent) photons before detection in a focal-plane-array detector. Other applications include sunglasses that both dim light when it is too bright, or amplify the light when it goes dark outside, thus providing for coherent night-vision. Other applications further include contact lenses, spectacles lenses, or night-vision goggles optical systems.

Creating gain in positive refractive index materials proceeds as described below, which is quite different than that for negative refractive index metamaterials. As described below, optical parametric amplification may be used within the positive high refractive index metamaterial, where such amplification may create gain even in excess of the compensated losses in the metamaterial.

Figure 17:
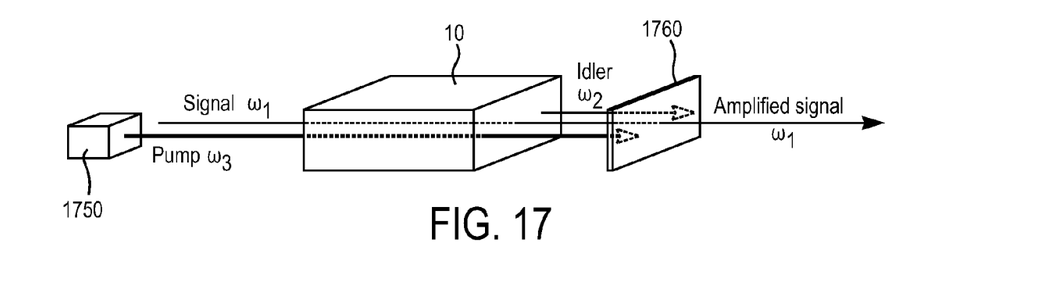
FIG. 17 is a schematic illustrating a system for providing optical gain for an optical material according to an exemplary embodiment.

FIG. 17 illustrates a system for achieving optical parametric amplification in positive refractive index metamaterial by nonlinear-optical three-wave mixing. The system of FIG. 17 includes an optical pump 1750 providing EMR at a pumping frequency ω3, an optical material 10, such as the optical material 10 of FIG. 1A, which has a high positive index of refraction, and a band-pass filter 1760. In three-wave mixing, the pumping frequency ω3 is co-aligned with the incoming signal photons of frequency ω1, and interacts in the metamaterial of optical material 10 in the process, and auxiliary wave ω2 is created. Thus, the system provides a coherent amplifier at frequency ω1. The specific gain of the amplifier depends on the power of the optical pump 1750.

Multiple Lens Systems and Aberration Corrections

Figure 18:
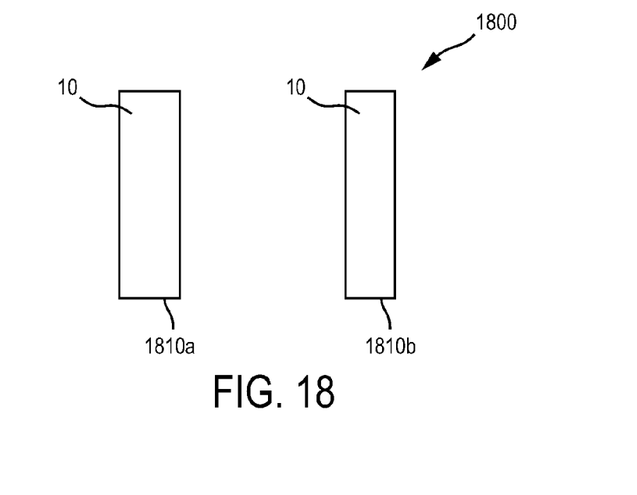
FIG. 18 is a schematic illustrating a multi-element optical system according to an exemplary embodiment.

FIG. 18 illustrates a multi-element optical system 1800 with a plurality of optical components such as optical elements 1810*a* and 1810*b*. While FIG. 18 illustrates two optical elements, in general the number of optical elements may be more than two. The optical elements 1810*a* and 1810*b* may each be made of an optical material 10, such as the optical material 10 of FIG. 1A, which has a high positive index of refraction. The optical elements 1810*a* and 1810*b* may each be a lens, or one or more of the optical elements 1810*a* and 1810b may be optical components other than lenses. The multi-element optical system 1800 may be night-vision goggles, for example.

The optical elements 1810a and 1810b may each be lenses, where the lenses correct for optical aberrations. The multiple lenses may be used to decrease the optical aberrations in the optical system 1800, such as correcting for, for example, spherical aberration, coma, chromatic aberration, astigmatism and the like.

Fabrication

The nano structures here may be formed by a number of techniques. For example, the nano-particles may formed by at least one of 2-dimensional or 3-dimensional fabrication employing electron-beam lithography, focused ion-beam, nano-imprinting, colloidal imprinting, or DNA-scaffolding techniques.

The invention has been described in detail with particular reference to preferred embodiments thereof, but it will be understood by those skilled in the art that variations and modifications can be effected within the spirit and scope of the invention.

What is claimed is:

1. An optical material comprising:
   at least one layer of a metamaterial, each layer of metamaterial comprising:
   a matrix material; and
   a plurality of nano-particles geometrically arranged in an array within the matrix material such that the layer of metamaterial has a high positive refractive index based on a cooperative plasmon effect at a predetermined electro-magnetic radiation (EMR) wavelength relative to the refractive index of the matrix material without the nano-particles.

2. The optical material of claim 1, where the positive refractive index at the predetermined EMR wavelength is polarization insensitive to the EMR being transmitted or reflected by the optical material.

3. The optical material of claim 1, where the nano-particles comprise metals, or transparent conducting oxides or nitrides.

4. The optical material of claim 3, where the nano-particles comprise gold, silver, copper, or aluminum.

5. The optical material of claim 3, where the nano-particles comprise at least one material selected from the group consisting of indium tin oxide (ITO), Al:ZnO, Ga:ZnO; TiN and ZrN.

6. The optical material of claim 1, where the nano-particles comprise single-walled carbon nanotubes, or highly doped short length semiconductor nanowires.

7. The optical material of claim 1, where the shapes of the nano-particles may be cylinders, rods, rectangular cross-section bars, ellipsoid, stars, spheres, spheroids, cones, cups, shells, rings or cubes.

8. The optical material of claim 1, where the plurality of nano-particles are geometrically arranged in at least one of a regular or an irregular array.

9. The optical material of claim 8, where the array is at least one of a square array, a rectangular array, a hexagonal array or an octagonal array.

10. The optical material of claim 1, where the plurality of nano-particles are formed by at least one of 2-dimensional or 3-dimensional fabrication employing electron-beam lithography, focused ion-beam, nano-imprinting, colloidal-suspension patterning, or DNA-scaffolding techniques.

11. The optical material of claim 1, where the layer of metamaterial has the high positive refractive index at the predetermined EMR wavelength, where the predetermined EMR wavelength is in the ultraviolet, visible, near infrared, short wave infrared, mid wave infrared, long wave infrared, or TeraHertz region of the electromagnetic spectrum.

12. The optical material of claim 1, further comprising gain material embedded in or close to the matrix material, where the gain material provides an amplification or reduction of EMR passing through the optical material at the predetermined EMR wavelength.

13. The optical material of claim 12, where the gain material provides an amplification compensating losses of EMR passing through the optical material at the predetermined EMR wavelength.

14. A multi-element optical system, comprising a plurality of optical components, each comprising the optical material of claim 1.

15. The multi-element optical system of claim 14, where the optical components comprise lenses.

16. The multi-element optical system of claim 15, wherein the lenses correct for optical aberrations.

17. A lens comprising the optical material of claim 1.

18. The lens of claim 17, further comprising gain material embedded in or close to the matrix material, where the gain material provides an amplification or reduction of EMR passing through the optical material at the predetermined EMR wavelength.

19. The lens of claim 18, where the lens is one of a contact lens or a spectacles lens.

20. An optical system comprising the lens of claim 18, wherein the optical system comprises night-vision goggles.

21. The lens of claim 17, wherein the lens has a curved surface.

22. The lens of claim 17, wherein lens is a gradient index (GRIN) lens, and the spatial scale of the geometrical arrangement of the nano-particle dimensions is non-uniform such that the optical material has a spatially varying refractive index.

23. The lens of claim 22, where the nano-particles are metal or non-metal particles.

24. The lens of claim 22, where the optical material has at least one of a spatially varying nano-particle length, nano-particle width, or nano-particle lattice constant.

25. The lens of claim 22, where the plurality of nano-particles are formed by at least one of 2-dimensional or 3-dimensional fabrication employing electron-beam lithography, focused ion-beam, nano-imprinting, colloidal-suspension patterning, or DNA-scaffolding techniques.

26. The lens of claim 22, where the plurality of nano-particles are arranged to be in planes of nano-particles stacked parallel to each other.

27. The lens of claim 22, wherein the optical material provides a non-linear optics effect.

28. An optical system comprising the lens of claim 22, wherein the optical system is one of a micro-lens and nano-lens arrays, a lens-array for a focal-plane array detector, an ultra-wide bandwidth hyper-spectral imagery system, a telecommunication spatial-multiplexing and signal cross/interconnections system, a biological and medical imaging at the cellular and sub-cellular spatial-scale system, or a miniaturized 3D-integral-imaging and computational-imaging system.

29. A method of operating an optical element comprising an optical material, wherein the optical material comprises: at least one layer of a metamaterial, each layer of metamaterial comprising: a matrix material; and a plurality of nano-particles geometrically arranged in an array within the matrix material such that the layer of metamaterial has a high positive refractive index based on a cooperative plasmon effect at a predetermined electro-magnetic radiation (EMR) wavelength relative to the refractive index of the matrix material without the nano-particles, the method comprising:

adjusting the optical element to receive EMR at the predetermined EMR wavelength.

30. A method of forming an optical material comprising at least one layer of a metamaterial, the method comprising:

forming a matrix material; and embedding a plurality of nano-particles to be geometrically arranged in an array within the matrix material to form the at least one layer of a metamaterial such that the at least one layer of metamaterial has a high positive refractive index based on a cooperative plasmon effect at a predetermined electro-magnetic radiation (EMR) wavelength relative to the refractive index of the matrix material without the nano-particles.

* * * * *